(No Model.)

W. STANLEY.
ALTERNATING CURRENT MOTOR.

No. 599,810. Patented Mar. 1, 1898.

WITNESSES,
A. H. Abell.
B. B. Hull

INVENTOR,
William Stanley
By Geo. W. Hendgett
Atty

THE NORRIS PETERS CO., PHOTO-LITHO., WASHINGTON, D. C.

UNITED STATES PATENT OFFICE.

WILLIAM STANLEY, OF PITTSFIELD, MASSACHUSETTS, ASSIGNOR TO THE GENERAL ELECTRIC COMPANY, OF NEW YORK.

ALTERNATING-CURRENT MOTOR.

SPECIFICATION forming part of Letters Patent No. 599,810, dated March 1, 1898.

Application filed May 9, 1896. Renewed November 17, 1897. Serial No. 658,805. (No model.)

*To all whom it may concern:*

Be it known that I, WILLIAM STANLEY, a citizen of the United States, residing at Pittsfield, county of Berkshire, State of Massachusetts, have invented certain new and useful Improvements in Alternating-Current Motors, of which the following is a specification.

My invention relates to a novel type of induction-motor to be operated by phase-differing alternating currents. It is constructed with a single primary element or field-magnet structure and a single secondary core wound with closed coils, and hence differs from known motors of the two-field type—for example, that set forth in Patent No. 524,534, granted upon an application of mine August 14, 1894. The primary member and secondary circuit or circuits are so arranged that a magnetic flux of given phase relation induces current in the secondary, and this current is acted upon dynamically by magnetism of a different phase to produce torque in the manner more fully explained hereinafter.

In the accompanying drawings, Figures 1, 2, 3, and 4 illustrate a number of modified forms in which the invention may be embodied.

Figure 1:
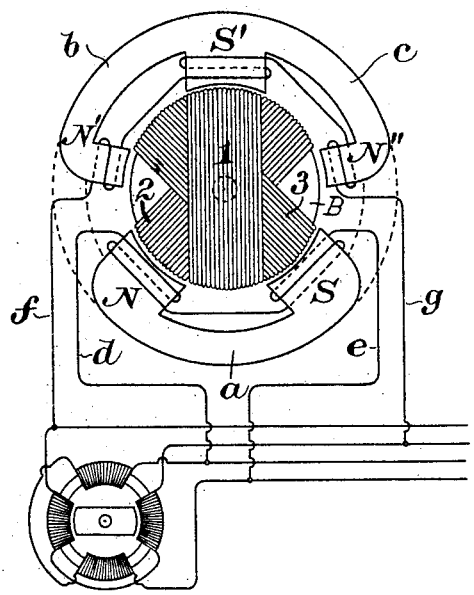

In Fig. 1 the fixed poles N S and connecting-yoke $a$ form part of a magnetic circuit for magnetism of one phase, while poles N' S' N" and yokes $b$ and $c$ form part of an independent magnetic circuit for magnetism of a different phase. The secondary member is inductively related to all the phase-differing primary fields, and the wire is so disposed that the current induced by the action of one field is acted upon dynamically by one or more of the fields of different phase. The motor here illustrated is assumed to be of the two-phase type, and hence the poles N S may be wound with coils in one branch $d\ e$ of a quarter-phase supply-circuit, and the poles N' S' N" with coils in the second branch of the circuit $f\ g$. Any other desired means, however, may be employed for maintaining the phase-differing magnetic fluxes, many suitable arrangements being now known to engineers. The magnetic circuit through the poles N' S' N" is preferably divided, as shown, so that three pole-faces are presented to the secondary element in order to permit a more symmetrical disposition of the secondary conductors. In this case the entire flux passes through the pole S' and one-half of the flux through each of the poles N' N", so that the total flux is symmetrically disposed with reference to the secondary circuits when the latter are arranged as shown. The secondary member of the motor B consists of a single core and coils wound thereon in any well-known manner for providing closed electric circuits. In the diagram three coils are shown numbered 1, 2, and 3. With the motor at rest and the parts in the position shown, the coil 1 receives the flux through poles N and S and is in the position of maximum induction with reference to these poles, while the current thus induced in flowing through that part of its circuit which is adjacent to pole S' is acted upon by the phase-differing magnetism dynamically to produce torque. In the same way the fluxes threading the coils 2 and 3 from poles N' S' generate currents which are acted upon dynamically by the poles N S, and the parts are all so arranged that the torque effects produced by the different currents and magnetic fluxes are cumulative. The motor will therefore be subjected to a starting-torque and will start and run under load. After the motor has started from a position of rest the actions become more complex than those explained above, as each coil is subjected to induction due to the variations in the primary fluxes and also to induction due to the fact that in its rotation it cuts the lines of force emanating from the pole-pieces. The result is, as in the motor described in my former patent above referred to, that the machine tends to run up to synchronism only, and reaches that speed only in the theoretical case in which there is no load of any nature and no losses. In practice the motor "slips" slightly from synchronous speed, the amount of the slip depending on various causes, as the amount of the load and the resistance of the armature or induced winding. I have shown in this instance the secondary member wound with three coils in order to clearly illustrate the essential features of the invention, but in practice the number and connection of the secondary coils are capable of many modifications, as will be readily understood. In full lines independent cores for the phase-differing magnetic circuits are indicated, but in dotted lines I have shown that the cores may be united in a common ring. In many cases the latter will be preferable from a mechanical standpoint. So far as the operation of the motor is concerned either construction may be employed.

Figure 2:
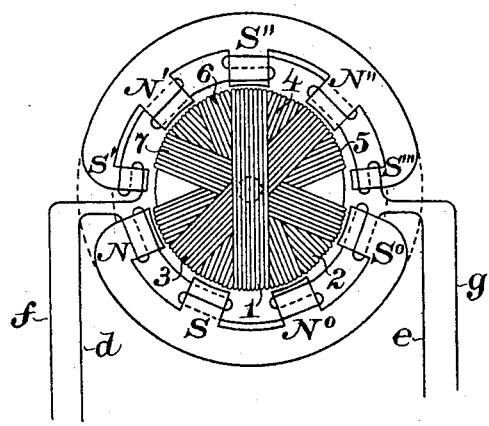

In Fig. 2 an arrangement is shown very similar to that already described, except that the poles in each phase group are multiplied, multiplying the magnetic fluxes correspondingly. In this case the poles N S N° S° carry magnetism of one phase, for which there are three paths, and the poles N' S' N'' S'' S''' form the second group, in which the magnetism is displaced by a quarter of a period. These last polar faces are divided into five parts rather than four, for the same reason as has been already explained in connection with Fig. 1. The different groups of poles may, as before, have independent yokes or a common yoke, as indicated in dotted lines. Magnetic fluxes having the proper difference of phase are also maintained in the two groups of poles in any desired way. If fed from a quarter-phase generator, one branch of the supply-circuit would include magnetizing-coils maintaining at that portion of each period when both of the alternating currents are positive north poles at N N° and south poles at S S°, while the second group of poles would have windings receiving currents of the second phase and maintaining at the instant considered polarities, as indicated in the drawings. Each of these poles alternate in sign as the supply-currents alternate, but the poles marked N of each group are always of the opposite sign from the poles marked S of the same group. In this arrangement the secondary member is shown as having eight coils. With the parts as shown in the diagram it will be seen that coils 1, 2, and 3 have current and electromotive force induced in them by the poles N S N° S°, while the other half of each of these circuits is acted upon dynamically by magnetism of different phase from the second group of poles to produce torque. In the same way coils 4, 5, 6, and 7 are in a position where currents are generated by the poles N' S' N'' S'' S''', and these currents are acted upon dynamically by the first group of poles.

Figure 3:
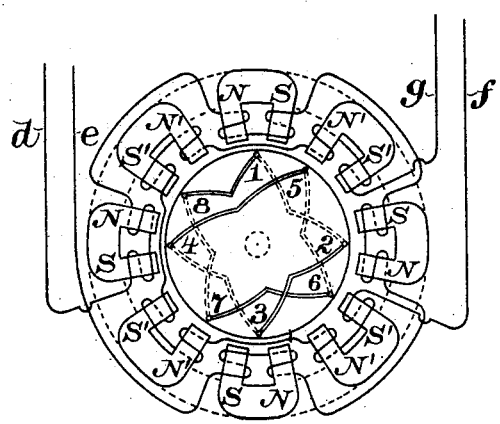

In Fig. 3 another form of the invention is shown with the poles grouped in a different manner. Instead of collecting all the magnetic circuits of each phase together, as in Figs. 1 and 2, each primary magnetic circuit stands by itself and circuits of the different phases are alternated. Thus each pair of poles marked N S forms a complete magnetic circuit, and the magnetism of all these circuits is of one phase, while the poles marked N' S' form magnetic circuits, all of which are of a second phase and alternate with the first named. In this case the yokes forming part of each circuit may be independent or connected, as indicated in dotted lines, so as to form a common yoke for all the poles in the manner now customary in building multipolar alternating machines. I have shown in this figure a secondary winding of the drum type in sufficient detail to show how it will be arranged in a commercial machine. Starting, for example, from the point 1, the circuit extends lengthwise of the secondary core, then across the end, as indicated in dotted lines, and forward over the core to the observer's end at the point 2, then across to point 3, then back to the rear end of the core, and so on, as will be understood by engineers from the diagram. The wire at the points 1, 2, 3, and 4, forming half of the circuit, is acted upon by magnetism of one phase from the poles N S to generate current, while the wire at points 5, 6, 7, and 8, forming the other half of the circuit, stands in such relation to the poles N' S' that the currents thus induced are acted upon dynamically to produce torque. As the motor moves forward the action is reversed, current being induced by the magnetism of poles N' S' and these currents being acted upon dynamically by the poles N S. I have shown in this instance only a single secondary circuit, but in practice the windings may be grouped in any of the well-known methods.

Figure 4:
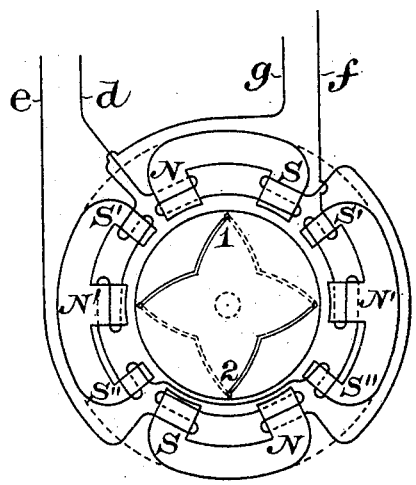

In Fig. 4 another modification is shown, in which the poles are grouped as in Fig. 3, but the magnetic circuit made by the poles N' S' S'' is divided in much the same manner as in Figs. 1 and 2 and for a similar purpose. In this case the poles marked N S are of one phase and the poles N' S' S'' of a second phase. With the secondary winding standing as shown it is apparent that the wire at points 1 and 2 receive the induction from the poles N S, generating currents which are acted upon dynamically by the poles of the second phase.

It will be seen that the magnetic fluxes in the various forms of my improved motor shown and described are essentially complanar—that is to say, they present themselves to the induced member in a common plane—which allows the structure of the motor to be much simplified.

The essential features of my invention reside in the generation of a plurality of complanar fluxes, each of a simple periodic or alternating character and fixed in space, each such as might be produced by a single phase alternating current acting alone on a magnetic circuit, and subject to the influence of these fluxes, dephased among themselves in their time relation, and an induced or secondary member capable of reacting upon them to produce torque. I also regard it as new and part of my present invention to provide a coil—as, for example, the coil 1 in Fig. 1—which on one side is in such relation to a magnetic field as to have current induced in it by the action of such field and on its other side is in such relation to another magnetic field as to react thereon to produce torque, thus securing with one coil, which may be of the simplest character, the effect which requires in the motor described in my said former patent two separate coils connected together electrically.

Another novel feature lies in the use of adjacent or contiguous poles of opposite signs excited so as to develop magnetism of the same phase, while at the same time there are presented to the induced member in the same plane one or more magnetic fluxes of a different phase.

I have illustrated the invention herein as applied only to a multiphase motor of one type—to wit, a two-phase motor. The application of the invention to other multiphase motors will, however, be readily understood by electricians.

What I claim as new, and desire to secure by Letters Patent of the United States, is—

1. In a multiphase motor, an inducing member provided with a set of contiguous polar faces of one magnetic phase, and a set of polar faces of a different magnetic phase, presented to the induced member so that the resulting fluxes are complanar, each of said sets containing poles of opposite signs, substantially as described.

2. An alternating-current motor comprising in combination, a single primary structure with means for maintaining therein a plurality of simple, complanar, dephased, non-intersecting periodic magnetic fields, each fixed in space, and a secondary member in inductive relation to said primary structure and capable of relative rotation, substantially as described.

3. In an alternating-current motor a single primary member wound and connected to develop a plurality of dephased magnetic fluxes, in combination with a secondary member having a core and closed coils or circuits, one or more, arranged upon the core so that different portions of the same coil or circuit occupy distorted or unsymmetrical positions with reference to the paths of the dephased magnetic fluxes, such that one portion of any given circuit will be acted upon inductively by a flux of given phase to generate current, while simultaneously another portion of the same circuit will be in a position to be acted upon dynamically by a flux of different phase to produce torque.

4. In an alternating-current motor, an inducing member provided with a plurality of polar faces, comprising at least one of each sign, adjacent to each other and excited in the same magnetic phase, with other polar faces excited in a different magnetic phase, the polar faces being so placed with relation to each other that their fluxes are complanar, in combination with an induced member capable of rotation relatively to said polar faces, substantially as described.

5. An alternating-current motor comprising in combination a single primary member having sets of polar faces, exciting-coils inducing non-intersecting complanar dephased magnetic fluxes, each of which is fixed in space and passes through its own set of polar faces, and a secondary member in inductive relation to the primary member having a single core and closed coils or circuits, one or more, arranged upon the core, so that different portions of the circuits occupy distorted or unsymmetrical positions with reference to the different sets of polar faces, such that one portion of any given circuit will be acted upon inductively by a flux of given phase to generate current, while simultaneously another portion of the same circuit will be in a position to be acted upon dynamically by a flux of different phase to produce torque, substantially as described.

6. In an alternating-current motor the combination of a multiphase inducing member, and a secondary member so wound that when one side of any particular coil or circuit is under an inducing-pole of one phase, its other side occupies a position between two contiguous inducing-poles of opposite sign of a different phase, substantially as described.

In witness whereof I have hereunto set my hand this 23d day of April, 1896.

WILLIAM STANLEY.

Witnesses:
ADA B. POMEROY,
MARY A. BRISTOL.